United States Patent
Banerjee et al.

(10) Patent No.: US 9,747,659 B2
(45) Date of Patent: Aug. 29, 2017

(54) STARVATION FREE SCHEDULING OF PRIORITIZED WORKLOADS ON THE GPU

(71) Applicant: Apple Inc., Cupertino, CA (US)

(72) Inventors: Kutty Banerjee, San Jose, CA (US); Eric O. Sunalp, Los Gatos, CA (US); Tatsuya Iwamoto, Foster City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/851,629

(22) Filed: Sep. 11, 2015

(65) Prior Publication Data
US 2016/0358305 A1 Dec. 8, 2016

Related U.S. Application Data
(60) Provisional application No. 62/172,166, filed on Jun. 7, 2015.

(51) Int. Cl.
*G06T 1/20* (2006.01)
*G06F 9/50* (2006.01)

(52) U.S. Cl.
CPC .......... *G06T 1/20* (2013.01); *G06F 9/505* (2013.01); *G06F 9/5044* (2013.01); *G06F 2209/5021* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 2001/0029519 A1* | 10/2001 | Hallinan | G06F 9/5016 718/104 |
| 2009/0160867 A1 | 6/2009 | Grossman | |
| 2010/0020087 A1* | 1/2010 | Elmieh | G06T 15/00 345/522 |
| 2011/0010490 A1* | 1/2011 | Kwon | G06F 3/0611 711/103 |
| 2011/0050713 A1* | 3/2011 | McCrary | G06F 9/3851 345/522 |
| 2013/0021353 A1 | 1/2013 | Drebin et al. | |
| 2013/0057560 A1* | 3/2013 | Chakraborty | G06F 13/14 345/520 |
| 2014/0176583 A1 | 6/2014 | Abiezzi et al. | |

(Continued)

FOREIGN PATENT DOCUMENTS
WO 2014/100452 A1 6/2014

*Primary Examiner* — Joni Richer
(74) *Attorney, Agent, or Firm* — Baker Hostetler LLP; Robert L. Hails

(57) ABSTRACT

Embodiments are directed toward systems and methods for scheduling resources of a graphics processing unit that determine, for a number of applications having commands to be issued to the GPU, a static priority level and a dynamic priority level of each application, work iteratively across static priority levels until a resource budget of the GPU is consumed, and starting with a highest static priority identify the applications in a present static priority level, assign a processing budget of the GPU to each of the applications in the present static priority level according to their dynamic priority levels, and admit to a queue commands from the applications in the present static priority level according to their processing budgets, and release the queue to the GPU.

20 Claims, 7 Drawing Sheets

(56) References Cited

U.S. PATENT DOCUMENTS

2015/0279067 A1* 10/2015 Yuda .................... G06T 1/20
345/441
2016/0098334 A1* 4/2016 Hariharakrishnan G06F 11/3013
702/186

* cited by examiner

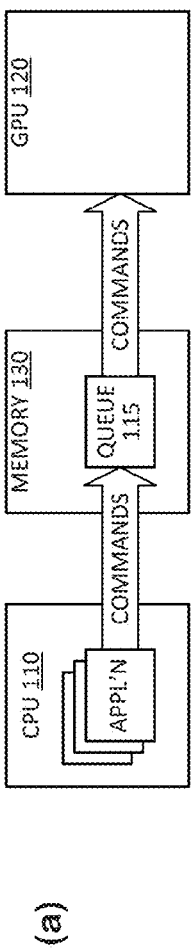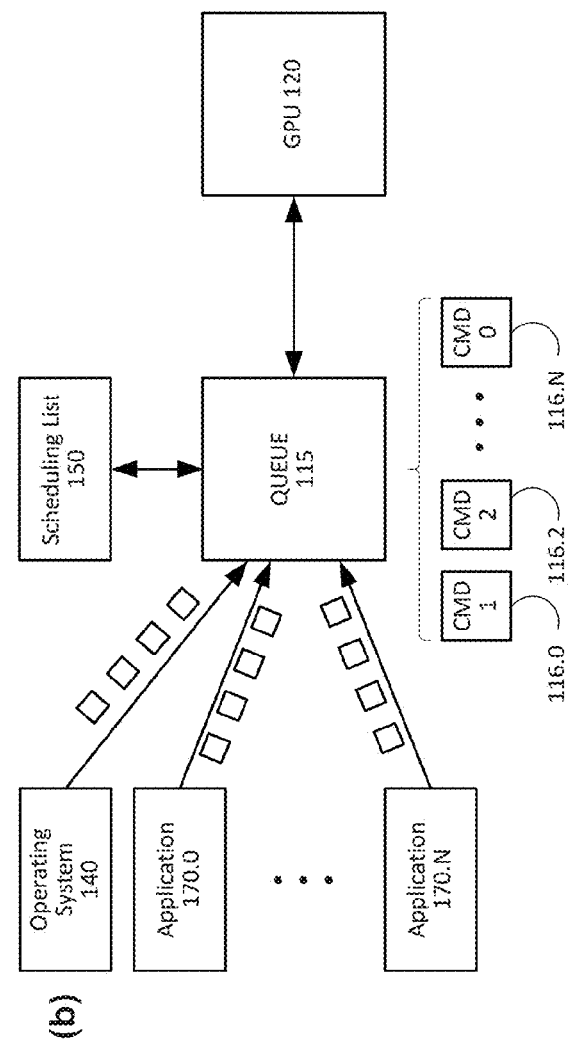
FIG. 1
100

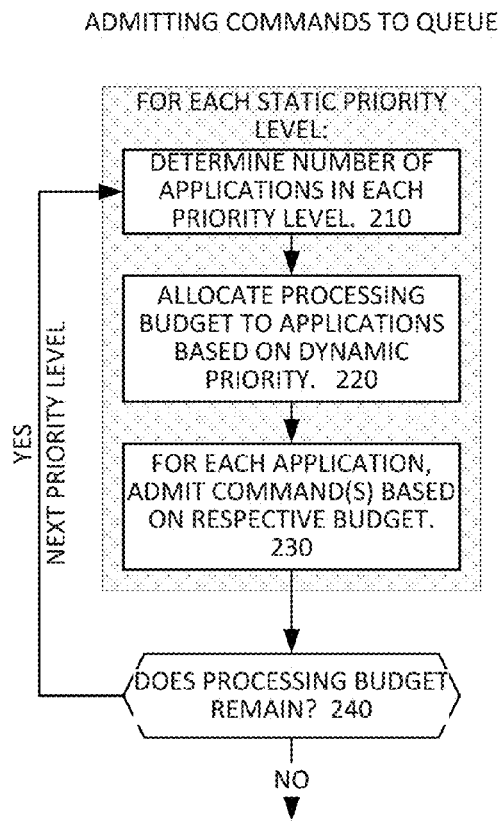
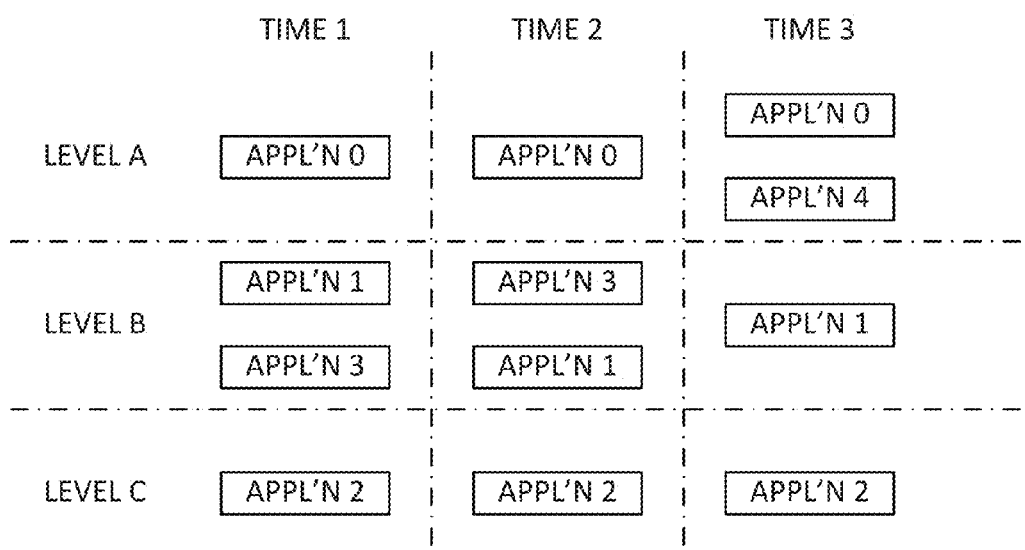

400

500

600

700

800

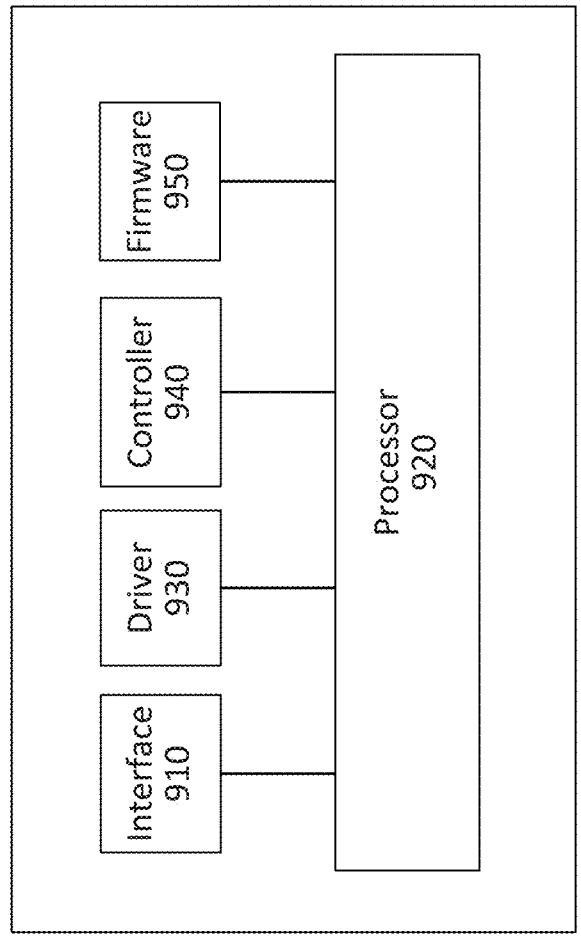

STARVATION FREE SCHEDULING OF PRIORITIZED WORKLOADS ON THE GPU

CLAIM FOR PRIORITY

The present disclosure benefits from priority of U.S. patent application Ser. No. 62/172,166, filed Jun. 7, 2015, the disclosure of which is incorporated herein in its entirety.

BACKGROUND

The present disclosure generally relates to graphical processing and, more particularly, to systems and methods for balancing performance between multiple graphical applications as well as analyzing performance of the graphical processing unit (GPU).

Many electronic devices include GPU(s) for presenting graphics on an electronic display device. Development of software applications for such devices is often complex and it is not uncommon for such applications to provide suboptimal system performance and resource utilization. One approach for distributing resources of the GPU is to assign varying priorities to each of the graphical applications. In a prioritized workload environment, however, some applications may monopolize the GPU at the expense of the other applications.

As existing approaches fail to fairly distribute graphical processing resources, the inventors have developed improved systems and methods for starvation free scheduling of prioritized workloads on the GPU.

BRIEF DESCRIPTION OF THE DRAWINGS

FIG. 1 is a simplified block diagram illustrating a system for scheduling GPU resources according to an embodiment of the present disclosure.

FIG. 2 illustrates a method for admitting commands to a queue according to an embodiment of the present disclosure.

FIG. 3 represents an example use of static and dynamic priorities according to an embodiment of the present disclosure.

FIG. 9 is a schematic view of a GPU according to an embodiment of the present disclosure.

DETAILED DESCRIPTION

Figure 4:
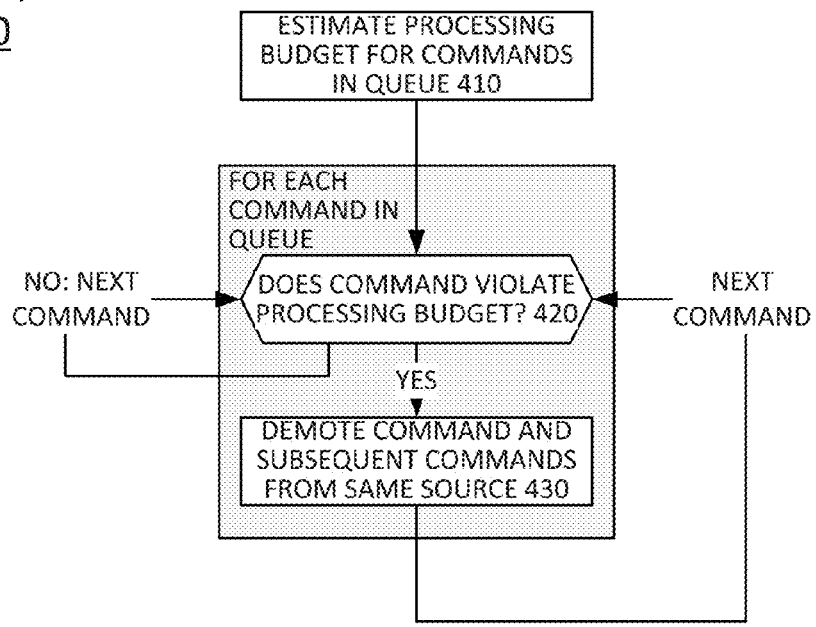
FIG. 4 illustrates a method for rescheduling commands according to an embodiment of the present disclosure.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Embodiments are directed toward systems and methods for scheduling resources of a graphics processing unit that determine, for a number of applications having commands to be issued to the GPU, a static priority level and a dynamic priority level of each application, work iteratively across static priority levels until a resource budget of the GPU is consumed, and starting with a highest static priority identify the applications in a present static priority level, assign a processing budget of the GPU to each of the applications in the present static priority level according to their dynamic priority levels, and admit to a queue commands from the applications in the present static priority level according to their processing budgets, and release the queue to the GPU.

In addition, embodiments are directed to systems and methods for rescheduling commands that estimate a processing budget of a GPU for each command in a queue, determine, for each command within the queue, whether the command violates its processing budget, and if the processing budget of a respective command is violated, demoting the violating command in favor of at least one other command in the queue.

In addition, embodiments are directed to systems and methods that, during each processing window, identify a command that violates its allotted resource budget, store information relating to the processing budget violation, and periodically transmit violation information to a graphics server.

FIG. 1 is a simplified block diagram illustrating a system 100 for scheduling GPU resources according to an embodiment of the present disclosure. As shown in FIG. 1(a), the system 100 may include a central processing unit (CPU) 110, a GPU 120, and a memory system 130 that may store queue 115. The queue 115 may store an array of commands that the GPU 120 may execute during a next iteration of execution. The queue 115 may be constructed by the CPU 110 and stored in a memory 130 where it may be accessed by the GPU 120.

As shown in FIG. 1(b), the CPU 110 may execute various programs representing an operating system 140 of the system 100 and various applications 170.0-170.N that require resources from the GPU 120. Each of the applications 170.0-170.N may supply commands, such as commands 116.0-116.N, to be executed by the GPU 120. The CPU 110 may determine which commands will be admitted to the queue 115 according to a hierarchical priority scheme, discussed herein. Further, the CPU 110 may manage commands after they are admitted to the queue to ensure that high priority commands are executed in a timely manner. For example, the CPU 110 may populate entries of a scheduling list 150 that maintains a priority ordered list of command(s) to be executed by the GPU 120. An example scheduling list may identify command(s), expected processing times, as well as their respective static and dynamic priorities. Additionally, the scheduling list 150 may store statistics (e.g., actual processing times) describing the system's execution of commands. Each of these operations is described hereinbelow.

Queue admission may be performed according to a hierarchical priority scheme. Each of the applications 170.0-170.N that is executing may be assigned a first priority level, called a "static" priority level that does not change within the system. Each application also may be assigned a second priority level, called a "dynamic" priority level that may change during operation of the GPU 120. Queue admission may consider both priorities when determining which commands may be admitted to the queue 115. In some instances, the queue 115 may be an unordered queue and commands having the highest static priority level may be selected for execution.

FIG. 2 illustrates a method 200 for admitting commands to a queue according to an embodiment of the present disclosure. The method 200 may iterate over each class of static priority that may be operating at a client device. For each static level, the method 200 may determine the number of applications active within the respective priority level that have commands to be admitted to the queue (box 210). The method 200 may allocate a processing budget to each of the applications within the static priority level based on that application's dynamic priority (box 220). Thereafter, commands of each application may be admitted to the queue based on the processing budget assigned to the application (box 230). Once admission decisions have been made for a given static level, the method may determine whether any processing budget remains for the GPU (box 240). If so, the method 200 may repeat the operations of boxes 210-230 for applications in the next lower static level. Otherwise, the method 200 may conclude.

The "processing budget" may represent a quantity of GPU processing resources that may be allocated between iterations of the method 200 of FIG. 2. For example, the method 200 may be repeated anew during a refresh rate of a display system that the GPU services (say, 30 frames per second). In such a case, the method 200 may allocate GPU processing resources to application commands, once every $\frac{1}{30}^{th}$ of a second.

In some embodiments, a background timer may periodically determine whether a given command has utilized the GPU for more than a predetermined duration (e.g., $\frac{1}{30}$th of a second) of continuous execution. If the command exceeds the predetermined duration, it may be preempted such that the queue is reordered to reflect a new execution order. Additionally, command(s) may be added to the queue. Here, the impact of the added command(s) to the processing budget may be determined based upon past command execution history for their respective source application(s).

In some instances, the GPU may be utilized by each of the applications in proportion to their respective priorities. Alternatively, or additionally, the GPU may be utilized such that the frame rate for each of applications is satisfied.

FIG. 3 represents an example use of static and dynamic priorities according to an embodiment of the present disclosure. In this example, three levels of static priority are illustrated, shown as levels A, B, and C in descending order of priority. Five applications, applications 0-4, are shown active at various times where commands may be admitted to a queue.

At time 1, FIG. 3 illustrates four applications 0-3. Application 0 is assigned to priority level A, applications 1 and 3 are assigned to priority level B and application 2 is assigned to priority level C. Thus, when the method 200 operates on these four applications, it may recognize application 0 as having the highest priority and may admit commands from application 0 to its queue. Assuming the method 200 reaches priority level B, the method 200 may recognize applications 1 and 3 as having equal static priority. Application 1 is shown having greater dynamic priority than application 3, however, and therefore processing budget may be assigned to each of the applications according to their relative dynamic priorities. If the method 200 reaches priority level C, then the method 200 may admit command(s) from application 2 to the queue.

At time 2, the same four applications 0-3 may be active. Application 0 is assigned to priority level A and, therefore, the method 200 may admit commands from application 0 to its queue. Assuming the method 200 reaches priority level B, the method 200 may recognize applications 1 and 3 as having equal static priority. Application 3 now has greater dynamic priority than application 1, however, and therefore processing budget may be assigned to each of the applications according to their relative dynamic priorities. If the method 200 reaches priority level C, then the method 200 may admit command(s) from application 2 to the queue.

At time 3, a different set of four applications 0-2 and 4 are shown as active. Applications 0 and 4 both are assigned to priority level A. Application 0 is shown having greater dynamic priority than application 4, however, and therefore processing budget may be assigned to each of the applications according to their relative dynamic priorities. Within priority level B, application 1 is the only active application and, therefore, commands may be admitted to the queue based on its priority (assuming the method 200 reaches priority level B in the first place). And, again, if the method 200 reaches priority level C, then the method 200 may admit command(s) from application 2 to the queue.

Assignments of static priority may be made according to a variety of factors. In a simplest case, the assignments simply may be coded into a directory (not shown) that expressly assigns priority levels to different applications. Alternatively, the assignments may be assigned based on an application's type. For example, a device operating system may be assigned a highest priority level (Level A in the embodiment of FIG. 3). In addition, the CPU may assign subsequent penalties. For example, a first originating application that is assigned to a high dynamic priority level may be preempted in favor of a second originating application having a lower dynamic priority if the first originating application has used the GPU 120 for an excessive period of time (e.g., a time period greater than a predetermined threshold, timer based re-evaluation, etc.). In another example, the dynamic priority of an originating application 170, or a particular command 116, may be re-calculated. Here, the dynamic priority level of an application 170 may be re-assigned. In some instances, re-assignments may be limited to sub-bands of a particular priority level such that the re-calculated priorities may not cross priority levels (e.g., high, medium, low).

Although the example depicted in FIG. 3 depicts three static priority levels A, B, and C, other configurations may be implemented. In some instances, static priority levels may be based on the type of application. For example, static priority levels may include graphical user-interface (GUI) priority, camera priority, media priority, and background priority in descending order of priority.

The GUI may be assigned to the highest priority level. Many GUI functions include quick bursts of commands. For example, commands may be used for composing frames by a windows server. A camera application may be assigned the next highest level of priority. Camera commands may utilize a high frame rate (e.g., 120 frames per second). However, camera commands typically include short bursts of commands. Game, media, browser, and map applications may be assigned to a third priority level. Lastly, background commands, which are typically executed as a batch process, may be assigned to the lowest priority level.

Other applications may be assigned to priority levels based on, for example, whether they are involved in high graphics rate processing (e.g., video rendering applications, gaming applications, and the like) or the graphics data rates that they require.

Assignments of dynamic priority may be made according to the applications' usage of GPU resources. For example, the method 200 may track the rate at which each application has been served the GPU within a most recent span of time of a predetermined duration (say, the past second). Based on these usage rates, applications that have been under-served within the span may be assigned relatively higher dynamic priority than other applications that have been over-served by the GPU. Such dynamic priorities, however, merely affect relative amounts of processing budget to be assigned to applications within a common static priority class. In the example of FIG. 3, even if application 2 (Level C) is under-served as compared to the applications of Levels A and B, the method 200 may continue to serve the applications 0, 1, and 3 with higher static priority ratings.

FIG. 4 illustrates a method 400 for rescheduling commands according to an embodiment of the present disclosure. As shown in FIG. 4, the method 400 may estimate a processing budget for each command in queue (box 410). The method 400 may determine, for each command in the queue, whether a respective command violates its processing budget (box 420). If the processing budget of a command is violated, the priority level of the command may be demoted (box 430). For example, if a command of a first application utilizes the GPU for an excessive period of time, the command may be preempted in favor of a command of a second application having a lower dynamic priority. In addition, subsequent commands originating from the same application also may be re-assigned to a lower dynamic priority level. Lastly, if a command does not violate its processing budget, the next command in queue may be transmitted to the GPU.

A variety of methods may be used to estimate a processing budget for a particular command. For example, an average processing budget for commands originating from a particular application may be calculated and stored.

In some embodiments, the method 400 may be implemented as background timer(s) that periodically monitor the queue. For example, a timer may periodically (e.g., once every 3 milliseconds) determine if a command is currently executing on the GPU while a higher static priority command awaits execution in queue. If so, the current command may be preempted in favor of the command having higher static priority. Here, no reordering of the queue is needed. In another example, a timer may periodically (e.g., once every 15 milliseconds) determine if command(s) originating from an application have exceeded their processing budget. If so, the dynamic priorities such commands may be altered within the application's static priority level.

In some instances, the processing budget may not allow command(s) of an application to execute for more than a predetermined period of time. For example, commands from an application may not execute for longer than 16 milliseconds continuously when another application is running. In this example, a frame rate of 30 frames per second (fps) may be guaranteed to both applications. Consider a first application that executes for 48 milliseconds continuously whereas a second application executes for 3 milliseconds. If the first application executes unchallenged, the frame rate of the second application would be 15 fps. However, if the second application is executed every 16 milliseconds, it may maintain a frame rate of 30 fps.

Figure 5:
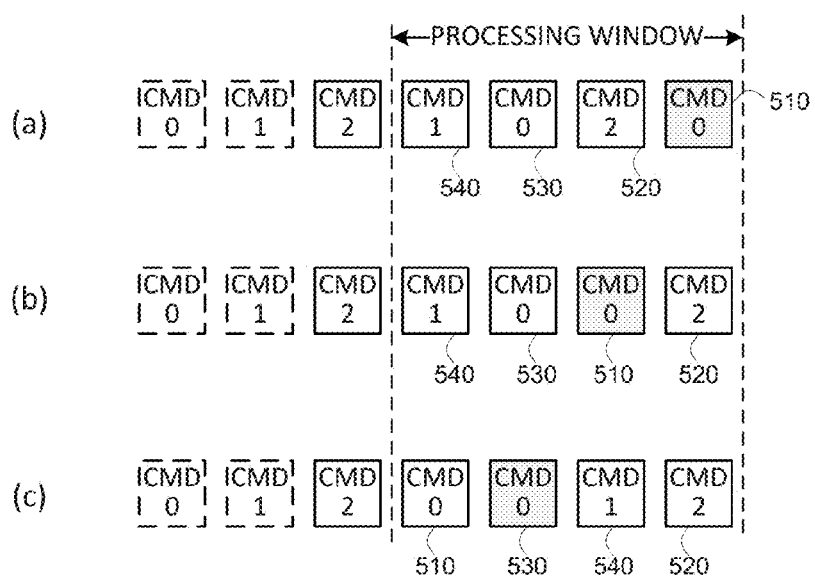
FIG. 5 illustrates a queue and processing window according to an embodiment of the present disclosure.

FIG. 5 illustrates a queue and processing window according to an embodiment. As shown in FIG. 5, the execution of commands within a queue may vary depending on whether a command violates its processing budget. In FIG. 5(a), assume that a command 510, which originated from an application 0, violates its processing budget. Accordingly, the command 510 may be demoted in favor of a command from another application (application 2). This is shown in FIG. 5(b), where command 510 has been demoted in favor of command 520.

In practice, the violating command 510 may be demoted in favor of several commands 520, 530 from other application in order to ensure that the commands from these other applications are executed with sufficient utilization to satisfy their processing requirements. Accordingly, the violating command 510 and other commands 530 from the same application (application 0) as the violating command 510 may be demoted in favor of commands 520, 540 from other applications. This is shown in the example of FIG. 5(c).

Figure 6:
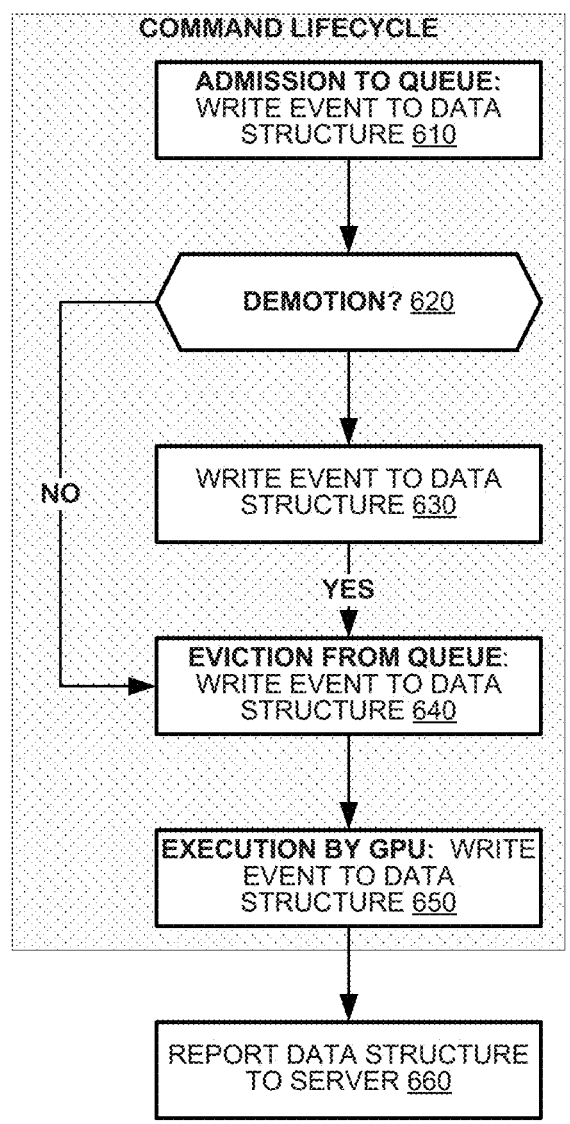
FIG. 6 illustrates a method for generating performance data according to an embodiment of the present disclosure.

FIG. 6 illustrates a method 600 for generating performance data according to an embodiment of the present disclosure. At predetermined events during the lifecycle of a command, the method 600 may write data representing those events to a data structure that eventually is returned to a graphics server for further study. According, when a command is admitted to the queue, data representing conditions of the command's admission may be written to the data structure (box 610). If ever the command is demoted within the queue (box 620), data representing conditions regarding such demotion may be written to the queue (box 630). When the command is evicted from the queue to be executed by the GPU, data representing conditions of the command's eviction from the queue may be written to the data structure (box 640). Finally, when the GPU completes execution of the command, data representing conditions of the command's execution may be written to the data structure (box 650). Such event data may be maintained for each command that is admitted to the queue and executed by the GPU. The event data regarding admission and demotion may be written by a CPU or other processor that administers the queue while event data regarding eviction and execution may be written by the GPU as it operates on the commands.

The data structure, therefore, may contain data regarding queue management over the course of a GPU's operation. The data structure may build data from which statistics may be maintained regarding commands that are admitted to a queue, command pendency and execution times and other data that may assist system designers to improve queue management processes. Ultimately, the data structure may be reported to a graphic server for analysis (box 660).

In some instances, the data structure may be the scheduling list (e.g., scheduling list 150 of FIG. 1(b)). The scheduling list may include command identifier(s), expected processing times, as well as their respective static and dynamic priorities. Additionally, the scheduling list may include statistics (e.g., actual processing times, demotion information, and the like) describing execution of commands.

During a given processing window, the GPU may identify individual commands that violate their respective processing budgets. For example, demotion information may identify command(s) that continuously execute at the GPU for a period longer than a predetermined period of time. In another example, demotion information may identify application(s) that have been assigned to a lower dynamic priority level. Additionally, demotion information may identify the originating application of the command, a command type, expected processing time, actual processing time, expected GPU utilization (e.g., 20 milliseconds per 40 millisecond processing window), actual GPU utilization, and the like.

Figure 7:
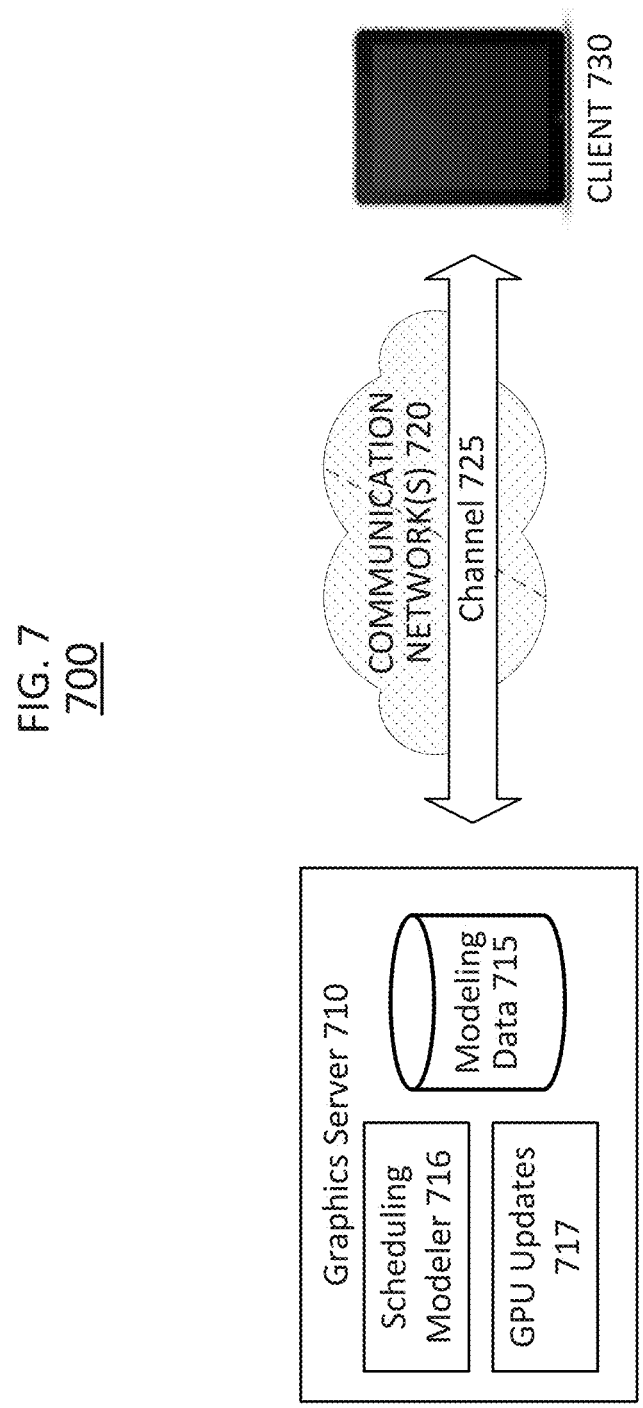
FIG. 7 is a simplified block diagram illustrating a networked system suitable for use with the present disclosure according to an embodiment of the present disclosure.

FIG. 7 is a simplified block diagram illustrating a networked system 700 suitable for use with the present disclosure according to an example embodiment. The system 700 may include a graphics server 710 and a client device 730 connected via a communications channel 725 of communication network 720.

The graphics server 710 may include a storage system 715 that may store a variety of modeling data retrieved from multiple client devices, such as 730. By analyzing the aggregated modeling data 715, the scheduling modeler 716 may generate a variety of scheduling models based on real world execution of commands by the GPU. For example, the scheduling modeler 716 may use modeling data to re-execute commands or generate command test scenarios on a GPU scheduling modeler 716. Accordingly, developers may determine whether the scheduling firmware of client device(s) 730 are operating as desired. In addition, updates 717 to the GPU firmware may be developed. The graphics server 710 may transmit such updates 717 to client device(s) 730 via the network 720.

The client device 730 may be any electronic device. The client device 730 may include one or more graphics applications adapted to download streaming media from remote distribution servers (not shown). Although the client device 720 is illustrated as a tablet computer in FIG. 7, client devices may be provided as a variety of computing platforms, including smartphones, personal computers, laptop computers, media players, set-top boxes, wearable electronic devices, other servers, and/or dedicated video conferencing equipment.

For the purposes of the present discussion, the architecture and topology of the network 720 is immaterial to the operation of the present disclosure unless discussed herein. The network 720 represents any number of networks that convey coded video data to the client device 730, including, for example, wireline and/or wireless communication networks. A communication network 720 may exchange data in circuit-switched and/or packet-switched channels. Representative networks include telecommunications networks, local area networks, wide area networks and/or the Internet. The example architecture depicted in FIG. 7 may be expanded to accommodate multiple graphics servers, distribution servers, client devices, communications networks, etc.

Figure 8:
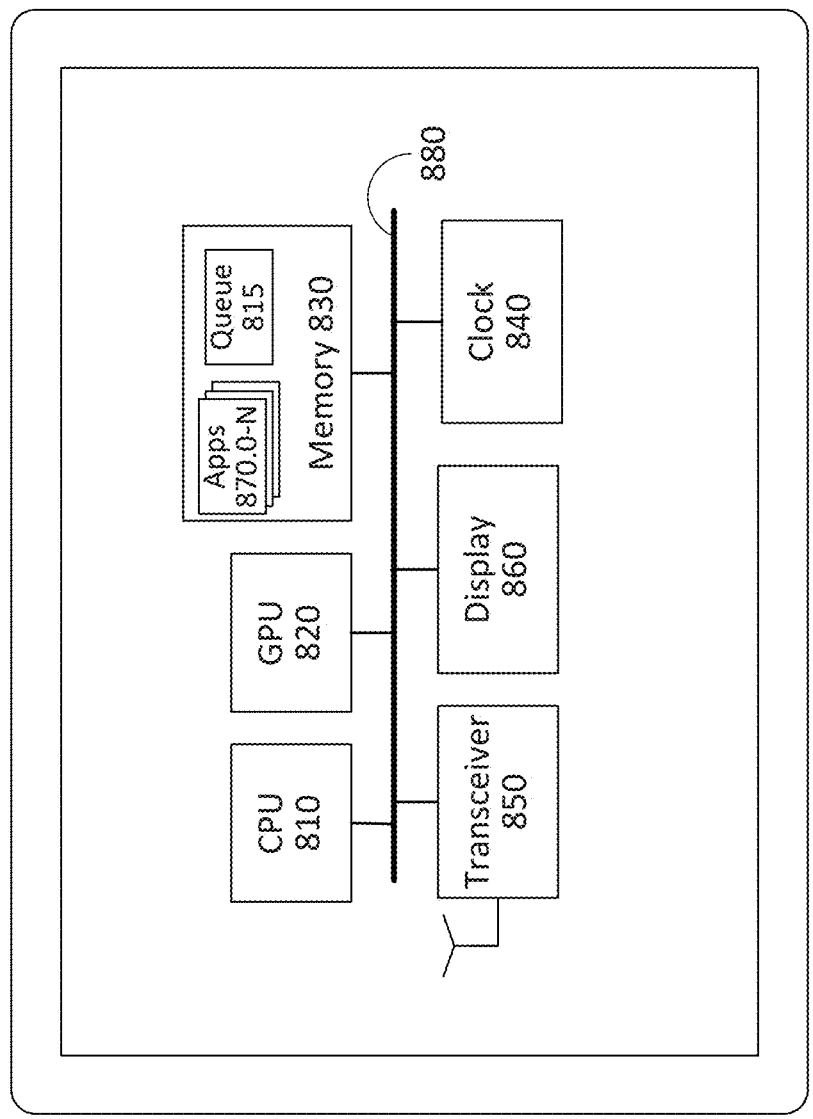
FIG. 8 is a schematic view of an electronic device according to an embodiment of the present disclosure.

FIG. 8 is a schematic view of an electronic device 800 according to an embodiment of the present disclosure. Electronic device 800 may include a CPU 810, GPU 820, memory 830 that stores applications 870.0-870.N and queue 815, clock 840, transceiver 850, and display 860. The client device 800 may also include a bus 880 that may provide a data transfer path for transferring data and/or power, to, from, or between various components of the electronic device 800.

CPU 810 may control the operation of components within electronic device 800. For example, the CPU 810 may be configured to admit commands of applications 870.0-870.N to queue 815. The CPU 810 may execute the methods illustrated in FIGS. 2 and 4 to manage queue admission and maintenance event. For example, the CPU 810 may allocate a processing budget to each of the applications 870.0-870.N. In another example, the CPU 810 may be configured to determine the static and/or dynamic priority levels of each application 870.0-870.N.

By relying upon the CPU 810 to determine the static and dynamic priority levels of each application 870.0-870.N as well as the order of commands in queue 815, the resources of the GPU 820 may be preserved. As a result, a greater number of applications 870.0-870.N may be supported, and/or higher frame rates may be achieved.

GPU 820 may retrieve and execute commands from queue 815. Accordingly, the GPU 820 may render graphics for applications 870.0-870.N. In some instances, the GPU 820 may render graphics in accordance with ITU-T H.265 (commonly "HEVC"), H.264, H.263 and/or other standard or proprietary protocols.

Memory 830 may store the operating system (OS) of the electronic device 800, applications 870.0-870.N, and the queue 815 configured to store commands destined for the GPU 820. For example, a command queue may be stored in a random access memory ("RAM") and supplied to a cache memory when needed.

In the various implementations, memory 830 may include one or more storage mediums, including for example, a hard-drive, flash memory, permanent memory such as read-only memory ("ROM"), semi-permanent memory RAM, any other suitable type of storage component, or any combination thereof. Memory 830 may include cache memory, which may be one or more different types of memory used for temporarily storing data for electronic device applications. Memory 830 may store graphics commands, software, firmware, wireless connection information, subscription information (e.g., information that tracks podcasts, television shows, or other media a user subscribes to), etc.

Transceiver 850 may be provided to enable the electronic device 800 to communicate with one or more other electronic devices or servers (e.g., graphics server 710) using any suitable communications protocol. For example, transceiver 850 may support Wi-Fi (e.g., an 802.11 protocol), Ethernet, Bluetooth, high frequency systems (e.g., 800 MHz, 2.4 GHz, and 5.6 GHz communication systems), infrared, transmission control protocol/internet protocol ("TCP/IP"), hypertext transfer protocol ("HTTP"), real-time transport protocol ("RTP"), real-time streaming protocol ("RTSP"), and other standardized or propriety communications protocols, or combinations thereof.

Electronic device 800 may also include one or more output components including display(s) 860. Display 860 may display rendered content to a user of electronic device 800. For example, display 860 may include any suitable type of display or interface for presenting visible information to a user of electronic device 800. In some embodiments, display 860 may include an embedded or coupled display. Display 860 may include, for example, a touch screen, a liquid crystal display ("LCD"), a light emitting diode ("LED") display, an organic light-emitting diode ("OLED") display, or any other suitable type of display.

In some embodiments, one or more components of electronic device 800 may be combined or omitted. Moreover, electronic device 800 may include additional components not depicted in FIG. 8. Electronic device 800 may be any stationary or portable electronic device, including tablet computers, smartphones, laptop computers, personal computers, set-top boxes, wearable electronic devices, and other consumer electronic products designed to execute graphics applications.

FIG. 9 is a schematic view of a GPU 900 according to an embodiment of the present disclosure. As shown in FIG. 9, the GPU 900 may include an interface 910, GPU processor 920, driver 930, controller 940, and firmware 950. The GPU 900 may be a standalone processor or may be one of multiple processors that are implemented as a single integrated circuit such as a system on a chip (SOC).

The interface 910 may be configured to receive commands from the queue stored within memory of the host device. In turn, the driver 930 may store received commands until the commands are supplied to the GPU processor 920. For example, while the GPU processor 920 is executing a current command, the driver 930 may store subsequent command(s) until the GPU processor 920 becomes available.

Firmware 950 may include program code to cause the GPU processor 920 to execute commands received by the interface 910 and supplied by the driver 930. The firmware 950 may include any type of storage medium. Alternatively, the firmware 950 may be stored on the memory 830 of FIG. 8.

The controller 940 may be configured to track the execution of commands for the GPU 900. For example, the controller may identify commands and corresponding applications that violate their allotted processing budgets. During a given processing window, the controller 940 may identify individual commands that violate their respective processing budgets. Alternatively, or additionally, applications that utilize the GPU for an excessive period of time during a given processing window may be said to violate their respective processing budgets.

In some embodiments, the controller 940 may generate statistics indicating the amount of time the GPU processor 920 dedicates to each command. In addition, such statistics may be supplied to the CPU and relayed to the graphics server. Thus, in this manner, developers can determine which instructions are the most expensive, and may use such information to generate improved scheduling models.

In addition, the controller 940 may instruct the interface 910 to retrieve additional commands for the GPU processor 920 from the queue. In another example, the controller 940 may communicate the status of GPU processor 920 to the CPU through interface 910. Unlike prior GPU implementations, the scheduling functions are provided directly by the CPU. Thus, resources of the GPU 900 may be dedicated to execution of received commands rather than scheduling functions.

It will be apparent to those skilled in the art that various modifications and variations can be made in the systems and methods for starvation free scheduling of prioritized workloads on the GPU of the present disclosure without departing form the spirit or scope of the disclosure. Thus, it is intended that the present disclosure cover the modifications and variations of this disclosure provided they come within the scope of the appended claims and their equivalents.

The invention claimed is:

1. A method for scheduling resources of a graphics processing unit (GPU), comprising:
   determining, for a number of applications having commands to be issued to the GPU, a static priority level and a dynamic priority level of each application;
   iteratively, working across static priority levels until a resource budget of the GPU is consumed, and starting with a highest static priority level:
      identifying the applications in a present static priority level,
      assigning a processing budget of the GPU to each of the applications in the present static priority level according to their dynamic priority levels, and
      admitting to a queue commands from the applications in the present static priority level according to their processing budgets; and
   releasing the queue to the GPU.

2. The method of claim 1, wherein the method is performed by a central processing unit of a device in which the GPU is located.

3. The method of claim 1, wherein the method is performed by a processing unit of a device in which the GPU is located that is different from the GPU.

4. The method of claim 1, further comprising, when the GPU executes a command of a given application, revising the given application's dynamic priority level.

5. The method of claim 1, further comprising, when a command of a given application is admitted to the queue, revising the given application's dynamic priority level.

6. The method of claim 1, further comprising, after the admitting:
   for a predetermined number of commands in queue, estimating a processing time for each of the commands,
   estimating a processing budget for each of the predetermined number of commands, and
   if an estimated processing time of a given command exceeds its processing budget, demoting the given command within the queue in favor of another command.

7. The method of claim 1, further comprising, after the admitting:
   estimating a processing time for a command currently being executed by the GPU,
   estimating a processing budget for the command currently being executed, and
   if the estimated processing time of the command currently being executed exceeds the processing budget of the command currently being executed, suspending execution of the command currently being executed in favor of another command.

8. A electronic device comprising:
   a processing system, including a graphics processing unit (GPU) and a second processor; and
   a memory storing one or more programs for execution by the processing system, the one or more programs including instructions for:
      determining, for a number of applications having commands to be issued to the GPU, a static priority level and a dynamic priority level of each application;
      iteratively, working across static priority levels until a resource budget of the GPU is consumed, and starting with a highest static priority:
         identifying the applications in a present static priority level,
         assigning a processing budget of the GPU to each of the applications in the present static priority level according to their dynamic priority levels, and
         admitting to a queue commands from the applications in the present static priority level according to their processing budgets; and
      releasing the queue to the GPU.

9. The electronic device of claim 8, wherein the instructions are executed by the second processor, which is a central processing unit of the device.

10. The electronic device of claim 8, wherein the one or more programs further include instructions for revising a given applications' dynamic priority level in response to the GPU executing a command of the given application.

11. The electronic device of claim 8, wherein the one or more programs further include instructions for revising a given application's dynamic priority level in response to a command of the given application being admitted to the queue.

12. The electronic device of claim 8, wherein the one or more programs further include instructions for, after the admitting:
- for a predetermined number of commands in queue, estimating a processing time for each of the commands,
- estimating a processing budget for each of the predetermined number of commands, and
- if the estimated processing time of a given command exceeds its estimated processing budget, demoting the given command within the queue in favor of another command.

13. The electronic device of claim 8, wherein the one or more programs further include instructions for, after the admitting:
- estimating a processing time for a command currently being executed by the GPU,
- estimating a processing budget for the command currently being executed, and
- if the estimated processing time of the command currently being executed exceeds the estimated processing budget of the command currently being executed, suspending execution of the command currently being executed in favor of another command.

14. A system, comprising:
- a graphics processing unit (GPU) operable to read commands from a queue data structure and to execute the commands read therefrom; and
- a central processing unit (CPU) that, responsive to program instructions, maintains a queue of commands for execution by the GPU, the CPU admitting commands to the queue by:
  - determining, for a number of applications having commands to be issued to the GPU, a static priority level and a dynamic priority level of each application;
  - iteratively, working across static priority levels until a resource budget of the GPU is consumed, and starting with a highest static priority level:
    - identifying the applications in a present static priority level,
    - assigning a processing budget of the GPU to each of the applications in the present static priority level according to their dynamic priority levels, and
    - admitting to a queue commands from the applications in the present static priority level according to their processing budgets.

15. The system of claim 14, wherein the CPU further is responsive to program instructions to reschedule commands in the queue by:
- estimating a processing budget of each command in the queue;
- determining, for each command within the queue, whether the command violates its processing budget; and
- if the processing budget of a respective command is violated, demoting the violating command in favor of at least one other command in the queue.

16. The system of claim 14, wherein the CPU further is responsive to program instructions to report the GPU performance by:
- during each processing window of the GPU, identifying a command that violates its allotted resource budget;
- storing information relating to the resource budget violation; and
- periodically transmitting violation information to a graphics server.

17. The system of claim 14, further comprising a memory system storing the queue.

18. A method for generating performance data, the method comprising:
- during each processing window of a graphical processing unit (GPU), identifying, from a plurality of commands processed during the window, a command that violates its allotted resource budget;
- storing information relating to the resource budget violation for the identified command; and
- periodically transmitting violation information to a graphics server.

19. The method according to claim 18, further comprising:
- estimating a processing budget for each command in a graphical processing unit (GPU) queue;
- determining, for each command within the queue, whether the command violates its processing budget; and
- if the processing budget of a respective command is violated, demoting the violating command in favor of at least one other command in the queue based on a processing budget of the at least one other command.

20. The method according to claim 19, further comprising demoting another command in queue originating from a common application source as the violating command.

* * * * *